Figure 7:
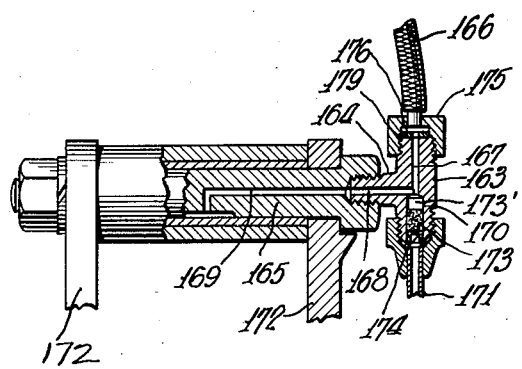

April 23, 1935. J. BIJUR 1,998,437
LUBRICATION
Original Filed July 30, 1923 2 Sheets-Sheet 1
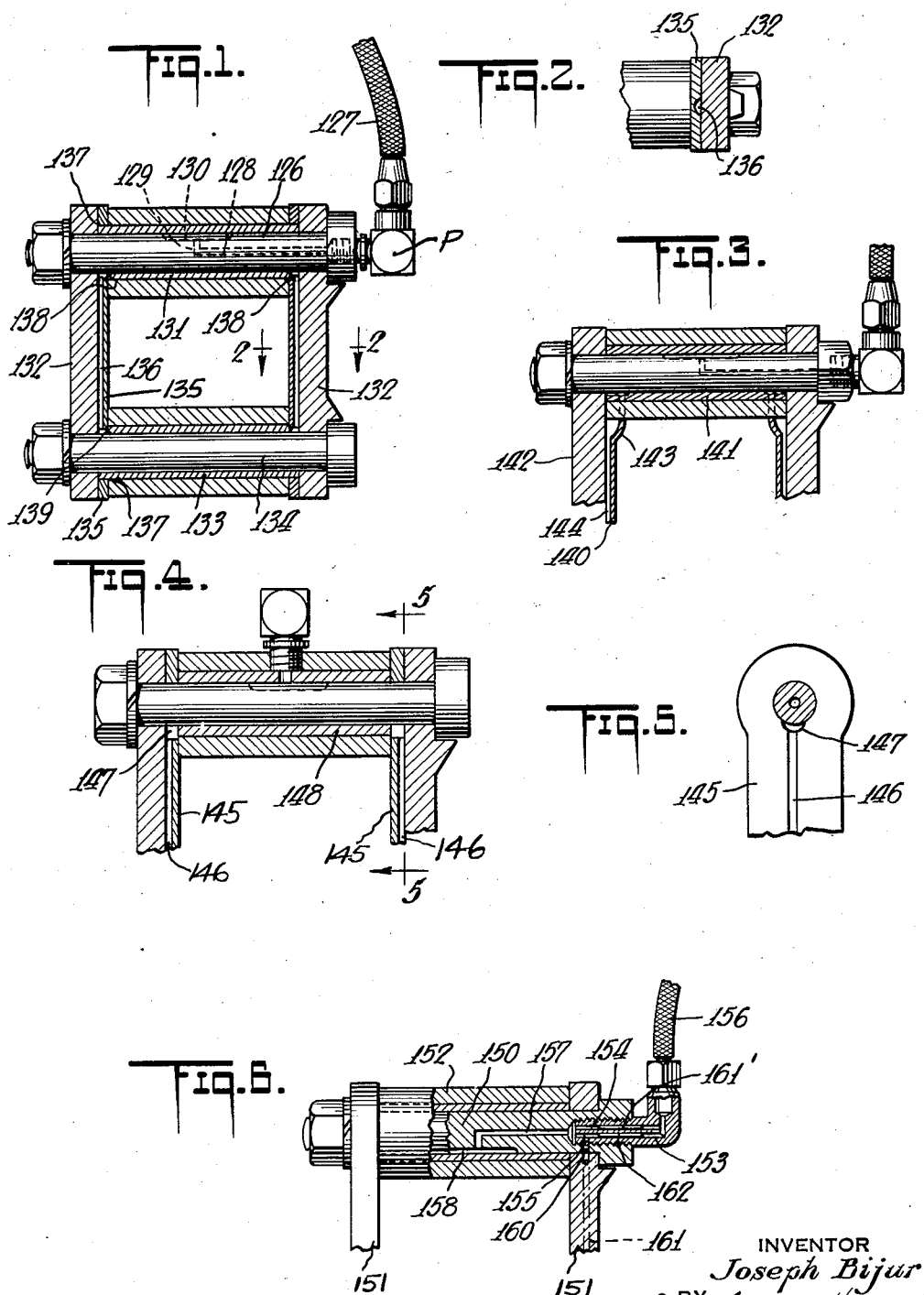
INVENTOR
Joseph Bijur
BY
ATTORNEYS April 23, 1935.  J. BIJUR  1,998,437
LUBRICATION
Original Filed July 30, 1923  2 Sheets-Sheet 2

INVENTOR
Joseph Bijur
BY
ATTORNEYS

Patented Apr. 23, 1935

1,998,437

UNITED STATES PATENT OFFICE 1,998,437

LUBRICATION

Joseph Bijur, New York, N. Y., assignor to Auto Research Corporation, a corporation of Delaware Original application July 30, 1923, Serial No. 654,606. Patent No. 1,779,205, dated October 21, 1930. Divided and this application March 22, 1930, Serial No. 437,971

30 Claims. (Cl. 184—7)

My present invention relates primarily to lubrication and is more especially concerned with the lubrication, from a single source, of a fitting having two or more bearings that are relatively displaceable during normal operation.

Although many of the broader features of the invention are applicable to the lubrication of various types of chassis fittings or elements, the present application shows the invention applied particularly to spring shackles, and certain special applications to drag links.

It is an object of the invention to provide a spring shackle with lubricating appurtenances which will assure proper distribution of oil to each of the two bearings thereof, without excessive overflow or deficiency at either bearing.

By my invention, I accomplish the object stated, while preserving substantially the simple and rugged construction, and the unobtrusive size and form of shackles of conventional design, and avoiding protruding parts that are likely to be destroyed or torn off during use of the vehicle.

The invention may be executed in a construction of the type in which the two bearings are lubricated in multiple through corresponding outlets thereat, both supplied concurrently from a single source. The lubricant distribution may be controlled by restrictions in the separate or branching ducts to the bearings, which restrictions offer resistance to flow substantially higher than the bearings. The restrictions are preferably embodied in special drip or seepage plug fittings, which may be applied at the bearings and have minute high resistance outlets, past which the oil drips at a rate in the order of a few drops per minute, upon application of substantial pressure at a central source of oil supply.

In one embodiment a conduit leads from the source of lubricant pressure to the drip plug at the bolt on the frame and a duct branching from a part of the conduit contiguous to the shackle, supplies lubricant to the drip plug at the spring bolt, both said conduit and said branching duct being preferably of such construction, so as to sustain the pressure up to the drip plugs. The branch duct to the spring eye bolt is formed with extra length to afford the needed flexibility for accommodating the relative movement between the spring eye and the frame, said extra length being preferably conformed in a loop or helix specially disposed with respect to the shackle construction to avoid excessive protrusion thereof.

The two drip plugs may be combined into a single multiple drip plug fitting applied say at the upper of the bolts, to drip to the upper bolt from one outlet thereof, and from the other outlet through a passage lengthwise of one of the links to the other bolt. It is understood that the drip plugs would be formed with outlets, the fineness or coarseness of which is so proportioned relative to the pressure with which the oil is propelled, as to effect drip of oil therethrough at a rate in the order of a few drops per minute.

An alternative embodiment of construction for parallel distribution of lubricant to the two bearings and more particularly applicable to constructions in which the lubricant flows by gravity head from a point above the fitting to the bearings thereof, includes a direct passage to the upper bearing, a branch passage preferably lengthwise of one of the shackle links to the other bearing, and a damming plug at the head of the branch passage to more nearly equalize the resistance to flow of the two lubricant paths so that the lower bearing shall not receive an excess of oil.

In another general or broad type of embodiment, the lubricant is directed in series, entering at and lubricating one bearing from which part of the lubricant continues in its flow to the other bearing. In one more specific embodiment of this type, the lubricant is delivered first to the upper of the bolts and passes by gravity therefrom to the lower. It is preferred in this case to provide a passage in the form of a well, groove or depression extending along the bearing surface, a link duct supplying the lower bolt by gravity flow.

To avoid protruding conduits, it is preferred to allow the oil to pass from the upper to the lower bolt, either through an appropriate duct bored longitudinally through one or both of the links or by a construction in which the duct is formed in the contacting surfaces of two superposed link elements, welded or rigidly clamped into a unitary composite link element. In the application to spring shackles of the tension type in which the lower bolt is loose or unloaded at the upper surface thereof and pressed firmly downwardly against the link, lubricant might be lost if the conduit through the link were passed without special precaution directly from the upper bolt to the lower. The bore in the link may, accordingly, be specially conformed to deliver the lubricant from the upper bolt to the lower or loaded surface of the lower bolt, or alternatively the eyes of one of the links may be arranged to be tightened about the two bolts, so that no leakage will occur even in a direct conduit passage between the bolts along said link.

In another embodiment, the lubricant is passed preferably to the more readily accessible of the two bearings, the excess beyond the requirements of said inlet bearing being passed on by pressure to the companion bearing. For this purpose, it is important to deliver the lubricant to the inlet bearing more rapidly than it can leak therefrom, thereby assuring delivery of lubricant at the other bearings. If the inlet bearing is likely to develop looseness in use, it may be desirable to supply the lubricant thereto in a single charge or slug, rather than by a dripping action. To assure transmission of lubricant from the inlet to the other bearing, particularly in constructions in which the latter is at a higher level than the former, it is preferred either to provide a check valve normally closing the connecting duct against loss of lubricant therefrom, and opening in operation to transmit lubricant, or alternatively to provide an open connecting duct of quite small volume, as, for instance, by inserting into the connecting duct a rod of diameter only little less than the bore of the duct.

This application is a division of my application Serial No. 654,606, filed July 30, 1923, now patent No. 1,779,205 granted October 21, 1930.

Whereas my parent application Serial No. 654,605, among other features, was particularly directed to the feature of supply lubricant to the upper unloaded side of the upper bolt of a tension shackle arrangement, permitting the oil to flow relatively freely to the ends of the bolt and then down to the lower bearing, the present application among other features, is particularly directed to the feature of supplying lubricant to the loaded side of the upper bolt, so that the oil must flow longitudinally or transversely through and/or away from the restriction of the loaded bearing surface. In the shackles to which the present application is particularly directed, the surface of the upper bolt receiving the lubricant is the loaded or restricted bearing surface.

Figure 8:
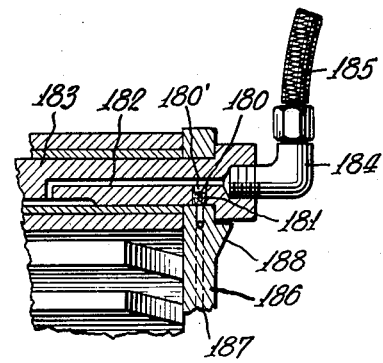
Figure 9:
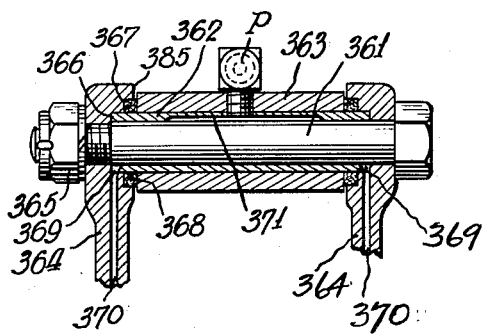
Figure 10:
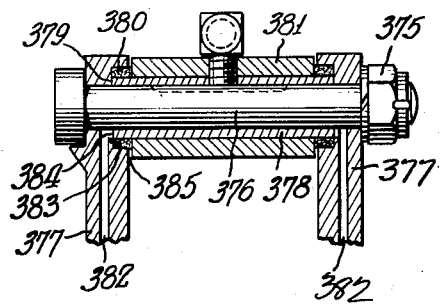

In the accompanying drawings in which are shown some of various possible embodiments of the several features of the invention, Fig. 1 is a view partly in longitudinal section of one form of spring shackle construction, Fig. 2 is a transverse sectional view taken along the line 2—2 of Fig. 1, Fig. 3 is a fragmentary view in longitudinal cross-section of a spring shackle showing another embodiment, Fig. 4 is a view similar to Fig. 3 of a further embodiment, Fig. 5 is a longitudinal sectional view taken along the line 5—5 of Fig. 4, Figs. 6, 7 and 8 are views similar to Fig. 4 of further embodiments, Figs. 9 and 10 are fragmentary views in longitudinal section of modified forms of spring shackles.

In the shackle lubricating installation of Figs. 1 and 2 only the excess beyond the lubricant required for said upper bolt passes on to the lower. If the lubricant were passed transversely through, rather than along the bolt surface in its path to the lower bolt, it might find too easy a path to the latter, so that inadequate lubrication of the upper bolt would be likely to ensue.

It is generally preferred to admit the lubricant to each of the bolts at a groove or flat at an unloaded part thereof, thereby avoiding the reduction of the effective wearing surface of the bearing, which would follow if the groove were at the loaded surface. It should be noted, however, that many of the advantages of the specific construction described, and of the alternative constructions described hereinafter may be attained even if the lubricant is admitted to either or both of the bolts or bearings at the loaded part thereof.

The shackle may be fed from a central system by drip or seepage plug fitting, as shown in the copending application Serial No. 580,668, filed August 9, 1922 or in Patents Nos. 1,632,772, 1,734,026 and 1,734,027.

In Figs. 1 and 2 is shown a form of shackle link in which an elbow drip plug P is illustratively shown fitting in the end of the upper bolt 126 in lieu of an old cup, said drip plug being supplied from a seamless flexible metal pipe or conduit 127 connected to the source of lubricant on the frame. The drip plug connects through a duct 128 longitudinally of the upper bolt communicating at its upwardly extending end 129 with a well or depression 130 at the upper or unloaded side of said bolt. In this embodiment, the excess lubricant beyond that required to meet the requirement of the upper bolt, exudes at the ends of the bushing 131 past the loaded bearing surface to flow along the links 132 and to enter at the ends of the lower bushing 133 by capillary action in order to lubricate the lower bolt 134. The lubricant, if desired, may be allowed to flow along the inner exposed surfaces of the links on its way to the lower bolt, in which case, loss of some of the lubricant might be entailed, and dirt or dust might be carried along to the lower bolt.

In order to avoid such loss and to avoid feeding oil charged with dust or dirt picked up from the links, I provide the construction shown in which the usual forged stamped link has superposed thereon, a stamped metal leaf 135 of the same peripheral or external appearance as the link and with a longitudinal groove or duct 136 in the inner surface thereof, connected between the eyes 137 thereof, the latter of diameter somewhat larger than the eye diameter of the link 132, so as to embrace the ends of bushings 131 and 133 as shown. The composite link construction may be at only one of the links, although as shown in the drawings, it is preferred to provide it on both links. As shown, the upper bushing may be bevelled at its opposite ends, particularly at the lowermost part thereof as at 138, and the lower bushing 133 may be similarly beveled at the uppermost part thereof as at 139 to expedite the flow of excess oil respectively from the upper bolt and to the lower bolt. The operation will be apparent, the excess lubricant beyond that for the requirements of the upper bolt, after working its way from the well 130 along the bearing surface, escaping at the notches 138 and flowing down the two ducts 136 and entering through the corresponding notches 139 between the bushing 133 and the lower bolt 134. It will be noted that the bottoms of said notches 138 and 139 are inclined and that said notches form pockets with inclined bottoms.

The construction of Fig. 3 is similar to Fig. 1 except that the link leaves 140 are devoid of the eyes encircling the bushings, but terminate short of the upper eye 141 and the lower eye (not shown). The links 142 are pressed in usual manner, each against the contiguous end of the eye and bushing 141. The leaves 140 are welded or otherwise rigidly secured to the link and each is provided with an outstanding lip 143 at its extreme upper end, partially straddling the lower part of the upper eye, said lips forming troughs to intercept the lubricant dripping from the ends of the upper bearing for delivery through duct 144 to the lower bolt.

The embodiment shown in Figs. 4 and 5 is similar to that of Figs. 1 and 2 except that in this case, the superposed metal leaf 145 is of the same size and shape as the link to which it is welded and has a channel or groove 146 therein connecting the eyes thereof, the lower end of the upper eye having a notch 147 cut thereinto, adjacent the end of the bushing 148, so that the excess lubricant dripping from the upper bolt will pass into the notch 147 and down the grooves 146 to the lower bolt.

Fig. 6 shows a shackle link construction, as of the tension type where the loaded surface is at the lower surface of the upper bolt including the usual bolt 150 clamping the parallel links 151 against the eye 152 about the upper bolt, the generally similar lower end of the construction being omitted from the drawings. In this embodiment, an elbow-shaped inlet fitting 153 is threaded into the end of the bolt 150 in lieu of an oil cup and has two passages 154 and 155 therethrough, through which the single inlet conduit 156 delivers. Passage 154 communicates with a longitudinal duct 157 in the upper bolt, which, in turn, communicates with a well or flat 158 at the bearing surface thereof, and lubricant from the other passage 155 passes through a radial duct 160 in the bolt into a longitudinal duct 161 in the link 151 from which the lower bolt (not shown) is supplied. In the present embodiment, the bores 154 and 155 of the inlet fitting have flow controlling restrictions, which may be comprise pins 161' and 162 in the passages respectively that greatly reduce the effective cross-section thereof, so that the division of the lubricant from conduit 156 will be controlled substantially by said restriction pins to reliably divide the charge or flow in parallel to the upper and lower bearings. In the present embodiment, it is assumed that the oil is forced past a drip plug (not shown) on the chassis frame and thence drops by gravity through conduit 156, the restriction pins 161' and 162 being sufficiently loose, to allow the lubricant dropping thereon, to drip therethrough slowly. The general arrangement shown in Fig. 6 is also applicable to a gravity-flow system of the general type disclosed in the copending application, Serial No. 604,464, filed December 2, 1922, in which the multiple restriction pin fitting devices would replace the more bulky distribution boxes disclosed in various embodiments in that application. Thus, by the present arrangement, the volume or charge measuring devices, either at the substation boxes or at the main or central station or at both, would be replaced by flow rate controlling restrictions.

It is, of course, understood that the multiple restriction pin outlets of Fig. 6 could be formed with tighter restriction pins of the type disclosed in my copending application, Serial No. 580,668, filed Aug. 9, 1922, the conduit 156 leading thereto would be of the pressure-tight type to transmit the applied pressure all the way to said drip plugs.

Fig. 7 shows a shackle construction identical with that of Fig. 6. A T-fitting 163 has its stem 164 threaded into the end of the upper bolt 165 with its cross-bar in vertical relation. Part of the lubricant is supplied by gravity flow from conduit 166 through vertical duct 167 in the T-fitting, horizontal duct 168 on the stem and through the duct 169 formed in the bolt to the bearing surface thereof. The rest of the lubricant continues downward through the lower arm 170 of the T-fitting and through a pipe or tube 171 parallel to the links 172 and connected by means of an elbow fitting (not shown) communicating through a longitudinal duct (not shown) in the lower bolt, from which the bearing surface of the latter is supplied.

In the present embodiment, the lower arm 170 of the T-fitting has an enlarged bore, plugged with a loose wad 173 of felt held in place therein by a perforated friction cup 174. The upper end of wad 173 is below the level of bore 168, leaving a well 173' thereabove into which oil may collect for subsequent drainage through the plug 173. This arrangement may be particularly advantageous to avoid insufficient lubricant at the lower bolt, should the oil become excessively retarded in its flow through the damming plug. The pipe 171 is connected to the arm 170 by a coupling construction and need not be here described. I have illustratively shown the inlet conduit 166 secured to the inlet end of the T-fitting by means of a union cap 175 which clamps a right-angled flaring flange 176 on said inlet conduit against an interposed perforated compression washer 179.

In operation, the wad 173 acts as a damming plug and obviates the tendency of the lubricant from the inlet conduit 166 to flow largely through the vertical pipe to the lower bearing. The felt is of such tightness and such resistance that the downward flow of the lubricant will be retarded sufficiently to assure proper, preferably substantially equally, distribution to the upper and lower bolts.

Fig. 8 shows a fragmentary detail of a shackle link generally similar in principle to that of Fig. 7, but of simplified construction. In this case, the felt damming plug 180 is inserted into a corresponding radial passage 181 communicating with a longitudinal duct 182 in the upper bolt 183. In this embodiment also, and for the same reason as described above in connection with Fig. 7, the plug 180 terminates below duct 182, leaving a well 180' thereabove. The lubricant is supplied to the upper bolt by a simple elbow fitting 184 to which the inlet tube 185 is connected. The present embodiment as that of Fig. 6 illustratively shows a tension shackle having a link 186 the duct 187 of which is kept in proper registry with the damming plug 180 by the integral lug 188 on the link, which prevents rotation relative to the bolt.

In Fig. 9 is shown a spring shackle construction of general application, designed particularly, so that no dirt, dust or water can enter the bearing to interfere with the efficacy of the lubrication thereof. The present embodiment includes the usual pair of bolts, the upper 361 of which only is shown encircled by the bushing 362 within the eye 363 either of the spring or in the frame, depending on whether the shackle is applied for tension or compression of the links thereof. The bushing in the present case is longer than the eye as shown and protrudes therebeyond at both ends to take the thrust of the links, which are pressed thereagainst when the bolt 361 is tightened by threading through the ling 364 and secured by the lock nut 365. In the present embodiment, each link 364 is formed with a stopped annular groove including a deeper depression 366 for the ends of the bushing and another and shallower depression 367 coaxial therewith for accommodating compression washers 368 encircling the bushing ends and of normal thickness, greater than the depth of groove 367 and of width less than the thickness of the wall of eye 363, so that as the parts are tightened, the washers 368 will be compressed and concealed by the contact or substantial contact of the links and ends of the eyes, the thrust, as heretofore noted, being taken by bushing 362.

In this case, I have shown the bushing notched as at 369 at opposite ends thereof in alignment with ducts 370 extending longitudinally of the links, so that the excess of lubricant supplied say through the drip plug *p* at the upper bolt 361, after working its way along the bearing surface will pass from the bolt 361 through the notches 369 and along ducts 370 to the lower bolt (not shown). In this case, I have illustratively shown a groove 371 in the bushing in lieu of the well, depression, flat or groove in the bolt shown in other views, said groove being formed in the unloaded side of the bushing.

In Fig. 10 is shown a fragmentary view of a somewhat modified form of a shackle of the common type in which the nut 375 on bolt 376 clamps the link 377 against the interposed bushing 378. In lieu of the stepped groove in this case, for accommodating the bushing end and the washer of Fig. 9, each link is here provided with but a simple annular groove 379 about the eyes, against the inner portion of which the bushing has a thrust fit, the felt washer 380 similar to that shown in Fig. 9 directly encircling the bushing at its extreme end and fitting snugly in the annular space between the periphery of the groove and the outer surface of the bushing 378. The upper bushing 378 is surrounded by the spring eye 381 or the frame eye, depending on whether the application is to a tension or compression shackle. The link or links 377 have longitudinal bores 382 therein similar to those in Fig. 9, except that these bores are separated from the counterbore 379 by a thin intervening ledge 383 which is broken away as at 384 adjacent the bushing to facilitate the flow of excess lubricant from the upper bearing surface through the duct 382 to the lower bearing surface, which it enters at a similar cut-away portion (not shown).

In both the embodiments of Figs. 9 and 10, the parts are arranged so that the thrust is taken between the link and the end of the bushing rather than between the link and the end of the eye, there being a minute clearance crevice 385 greatly exaggerated in the drawings between the latter two elements. The felt, leather or other washer acts, in effect, as a baffle, any dust, dirt or water which might find its way through the crevice 385 being kept thereby from passing through the grooved surface or about the bushing end to the bearings.

It will be seen that in the event of wear between the link and the bushing 362 or 378, the subsequent tightening of the bolt in Fig. 9 or of the nut in Fig. 10, may transfer the thrust bearing from the bushing to the eye, in which event the dust and water-proof character of the fitting will be substantially preserved since foreign matter could only with difficulty pass through the now tightened joint between the link and the eye, the washer 368 or 380 blocking the advance of such foreign matter to the bearings, as heretofore.

I claim:

1. Means for lubricating the bearings of a two-bearing fitting in parallel from a single source of lubricant pressure, said means including conduit connections having terminals at the bearings and carried by said fitting, said conduit connections having restrictions located at one of said bearings controlling the relative rates of flow of the lubricant to both of the bearings.

2. In a spring shackle, in combination, a pair of parallel bolts, one for a chassis frame eye, the other for a spring eye, links connecting said bolts, an inlet fitting mounted axially in the upper of said bolts, said fitting having two outlets, one communicating with the bearing surface of the upper bolt, the other communicating with a transverse duct through said bolt which in turn communicates with a longitudinal duct in one of said links for feeding lubricant to the lower of the bolts, said fitting including a pair of restriction pins therein in the path of the respective outlets to control the rate of oil travel therethrough.

3. In a spring shackle, in combination, a pair of parallel bolts, links connecting said bolts, one of said bolts to be sustained by a spring eye, the other to sustain the eye on the chassis frame, a fitting with a stem and an arm and having its stem mounted in the end of the upper bolt, said bolt being provided with a passageway leading to the bearing surface thereof, the arm of said fitting constituting an oil inlet, said fitting having a damming plug therein and a duct supplied from the fitting and communicating at its lower end with the lower bolt.

4. Means for lubricating a two-bearing fitting in a chassis installation, said means comprising a lubricant inlet to the upper of the bearings and a branch conduit between said inlet and said bearing, and leading to the lower of said bearings, said conduit including a damming element at the upper bearing to prevent excess flow to the lower bearing, said damming element being interposed between the inlet and the branched conduit leading to the lower bearing.

5. A spring shackle including bolts, links connecting said bolts, a fitting carried by said shackle and having two outlets, one leading to the bearing surface of the upper bolt and the other communicating with a duct longitudinally of one of said links to supply lubricant by gravity flow to the companion bolt, said fitting having flow distribution controlling restriction means.

6. In a spring shackle, in combination, a pair of parallel bolts, links connecting said bolts, one of said bolts to be sustained by a spring eye, the other to sustain the eye on the chassis frame, a single inlet fitting mounted near the upper end of the shackle for supplying lubricant to both the upper and the lower bearing, branch ducts for dividing the oil admitted to said fitting, one of said ducts leading to the bearing surface of the upper bolt, the other downward to the bearing surface of the lower bolt, and a damming plug in the latter duct to prevent excess flow to the latter bolt.

7. In a spring shackle, in combination, a pair of parallel bolts, links connecting said bolts, one of said bolts to be sustained by a spring eye, the other to sustain an eye on the chassis frame, an inlet fitting mounted in the end of the upper bolt and supplying an axial duct communicating with the bearing surface thereof, a branch duct supplied from said fitting extending to and continuing through one of said links to the lower bolt, and a damming plug fitted into said fitting, said damming plug being interposed in the course of lubricant flow to the lower bolt.

8. In a lubricating installation, in combination, bearings, a lubricant line leading to said bearings to supply the same concurrently and in parallel by gravity flow from a common source, and fitting means near the inlets to said bearings having restricted outlets controlling the rate of feed of lubricant therethrough to the associated bearings.

9. The combination set forth in claim 8 in which the restricted outlets comprise restriction pins or stems fitting in corresponding bores affording sufficient clearance for drip at the rate of several drops a minute therethrough under the gravity head.

10. A two-bearing appurtenance of a vehicle chassis including a lubricant inlet fitting attached to an upper portion of said appurtenance, said fitting being provided with a single inlet and with two pin restricted outlets to proportion the lubricant between said outlets, and ducts through the appurtenance leading from said outlets respectively, to said bearings to be lubricated, said outlets being both positioned at one of said bearings.

11. In a motor vehicle of the type having a two-bearing appurtenance with separated upper and lower bearings, each having inner and outer bearing elements with loaded and unloaded bearing surfaces, and one element of one of said separated bearings being connected to one element of the other separated bearing by an intervening rigid structure included in said appurtenance; the combination therewith of a lubricating installation having a source of lubricant supply at the upper bearing to supply both bearings, and a plurality of conduits extending through said appurtenance, one supplying the upper bearing and another extending from adjacent the upper to supply the lower bearing and having its inlet restricted at the upper bearing to limit the lubricant supply to the lower bearing.

12. The installation of claim 11, in which the lower bearing is supplied in series from the upper bearing and in which the loaded surface of the upper bearing serves to restrict the lubricant supply to the lower bearing.

13. The installation of claim 11, in which said inlet includes a restriction fitting positioned at the upper bearing.

14. The installation of claim 11, in which said first mentioned conduit supplies lubricant to the unloaded side of the upper bearing and the second mentioned conduit conveys lubricant from the loaded side of the upper bearing to the loaded side of the lower bearing, the lubricant supplied to the lower bearing flowing through the loaded portion of the upper bearing.

15. The installation of claim 11, in which said first mentioned conduit supplies lubricant to the middle of the upper bearing and the second mentioned conduit supplies lubricant to the end of the lower bearing from the end of the upper bearing.

16. The installation of claim 11, in which said first mentioned conduit supplies lubricant to the upper side of the upper bearing and said second mentioned conduit supplies lubricant to the upper side of the lower bearing from the lower side of the upper bearing.

17. A spring shackle, comprising a pair of bolts, a bushing on the frame supported on one of the bolts, a spring eye bushing supporting the other bolt, connecting links between said bolts, a leaf rigidly secured against the inner surface of one of said links, and a longitudinal lubricant conduit groove along the contacting surfaces of said link and said leaf and communicating with corresponding notches in the bushings, and means for supplying lubricant to the upper bolt, whereby excess from the upper bearing will drain through the link conduit to the lower bolt.

18. A dust and water-tight bearing comprising in combination, a bolt, a bushing encircling said bolt, end cap members, means pressing said end cap members against the ends of said bushing, a metallic eye shorter than said bushing and encircling the same and compressible washers in corresponding channels in said cap members and pressed against said eye when the cap members are tightened against said bushing.

19. As an article of manufacture, a spring shackle link having a stamped metal leaf of the size and shape of said link superposed thereover and rigidly secured thereto, said superposed leaf having eyes larger than those of said link to accommodate the spring eye and frame bushings, said leaf having a longitudinal groove at its inner surface connecting the eyes thereof and forming an oil conveying channel with said link.

20. In combination, a pair of parallel bolts, shackle links connecting the same, a bushing on the chassis frame encircling one of said bolts, a spring eye bushing encircling the other bolt, said bolts including means to press said links against said bushings, each of said links being provided with a longitudinal lubricant conduit connecting the upper and the lower bolts and having its eye encircling the bushing and each said bushing being notched adjacent the longitudinal groove for ease of lubricant flow from the upper to the lower bushing.

21. A spring shackle construction of the type including a pair of parallel bolts, links connecting said bolts, one of said bolts to be encircled by the spring eye and bushing thereof, the other by an eye on the frame and a bushing therein; the construction in which one of said links has a superposed stamped metal plate welded thereto, said plate of the same contour as said link with eyes concentric with the bolt eyes of said link, said plate having a longitudinal groove in the inner surface thereof forming an oil conveying channel with said link.

22. In a lubricating device for the shackle connections of a vehicle spring suspension, the combination of an upper and a lower shackle bolt; bearing surfaces in which said bolts are supported; a pocket with an inclined bottom provided in said bearing surfaces; means for supplying oil through one of said bearing surfaces to the surface of said upper bolt and to one of said pockets; and connections between said pockets for leading the used oil from the surface of said upper bolt to the surface of said lower bolt.

23. In a lubricating device for the shackle connections of a vehicle spring suspension, the combination of an upper and a lower shackle bolt, bearing surfaces in which said bolts are supported comprising the bores of connecting links, a pocket with an inclined bottom provided in said bearing surfaces, means for supplying oil through one of said bearing surfaces to the surface of said upper bolt and to one of said pockets, and connections between said pockets for leading the used oil from the surface of said upper bolt to the surface of said lower bolt.

24. In a lubricating device for the shackle connections of a vehicle spring suspension, the combination of an upper and a lower shackle bolt, a sleeve for said upper bolt, a sleeve for said lower bolt, a link connecting said upper and lower bolts provided with bores forming bearings for said bolts, a pocket in each of said bores having an inclined bottom, a passage joining said pockets, an oil supply, and connections leading oil through the sleeve of said upper bolt, whereby oil may be first used on the surface of said upper bolt and then lead to the surface of said lower bolt.

25. In a lubricating device for the shackle connections of a vehicle spring suspension, the combination of an upper and a lower shackle bolt, a sleeve for said upper bolt provided with a radial bore, a sleeve for said lower bolt, a link connecting said upper and lower bolts provided with transverse bores forming bearings for said bolts, a pocket in each of said bores having an inclined bottom, a passage joining the bottoms of said pockets, an oil supply, and connections leading oil through the radial bore of the sleeve of said upper bolt whereby oil may be first used on the bearing surface of said upper bolt and then lead to the bearing surface of said lower bolt.

26. In a dust-proof spring shackle, in combination, a pair of parallel bolts, bushings encircling said bolts, eyes shorter than said bushings encircling the same, parallel links near opposite ends of said bolts connecting the same, compressible gaskets encircling the bushings and fitting in corresponding channels in said links, means drawing said links tight against said washers to press said washers against the corresponding eyes, an inlet fitting to upply lubricant to the upper bolt and channel means longitudinally through one of said links to pass lubricant from said upper to the lower bolt.

27. A dust and water-tight bearing comprising in combination, a bolt, a bushing encircling said bolt, end members having annular grooves accommodating the ends of said bushing, an eye shorter than said bushing encircling the same, and compressible gaskets encircling said bushings and fitted between said end members and said eye in corresponding grooves, the entire end face of each of said gaskets being contacted by the corresponding end of said eye.

28. A dust and water-tight bearing comprising a bolt, end members having simple annular grooves concentric with said bolts, bushings encircling said bolts and fitting into said grooves, eyes shorter than said bushings, and compressible gaskets encircling the ends of said bushings and fitted between said bushings and the outer peripheries of the grooves and pressed by said eyes against said end members.

29. A dust and water-tight bearing comprising a pair of parallel bolts, links having simple annular grooves concentric with said bolts, bushings encircling said bolts and fitting into said grooves, eyes shorter than said bushings encircling the same, compressible gaskets encircling the ends of said bushings and fitted between said eyes and the outer peripheries of the grooves and pressed by said eyes against said links, and outlet duct means along said links for delivering excess lubricant from the upper of the bolts to the lower.

30. The combination set forth in claim 29 in which the longitudinal ducts extend through the links contiguous to the gasket and in which the partition wall between the bushing and the duct is omitted adjacent the bushing for facility in delivery of lubricant to and from the duct.

JOSEPH BIJUR.